United States Patent Office 2,981,300
Patented Apr. 25, 1961

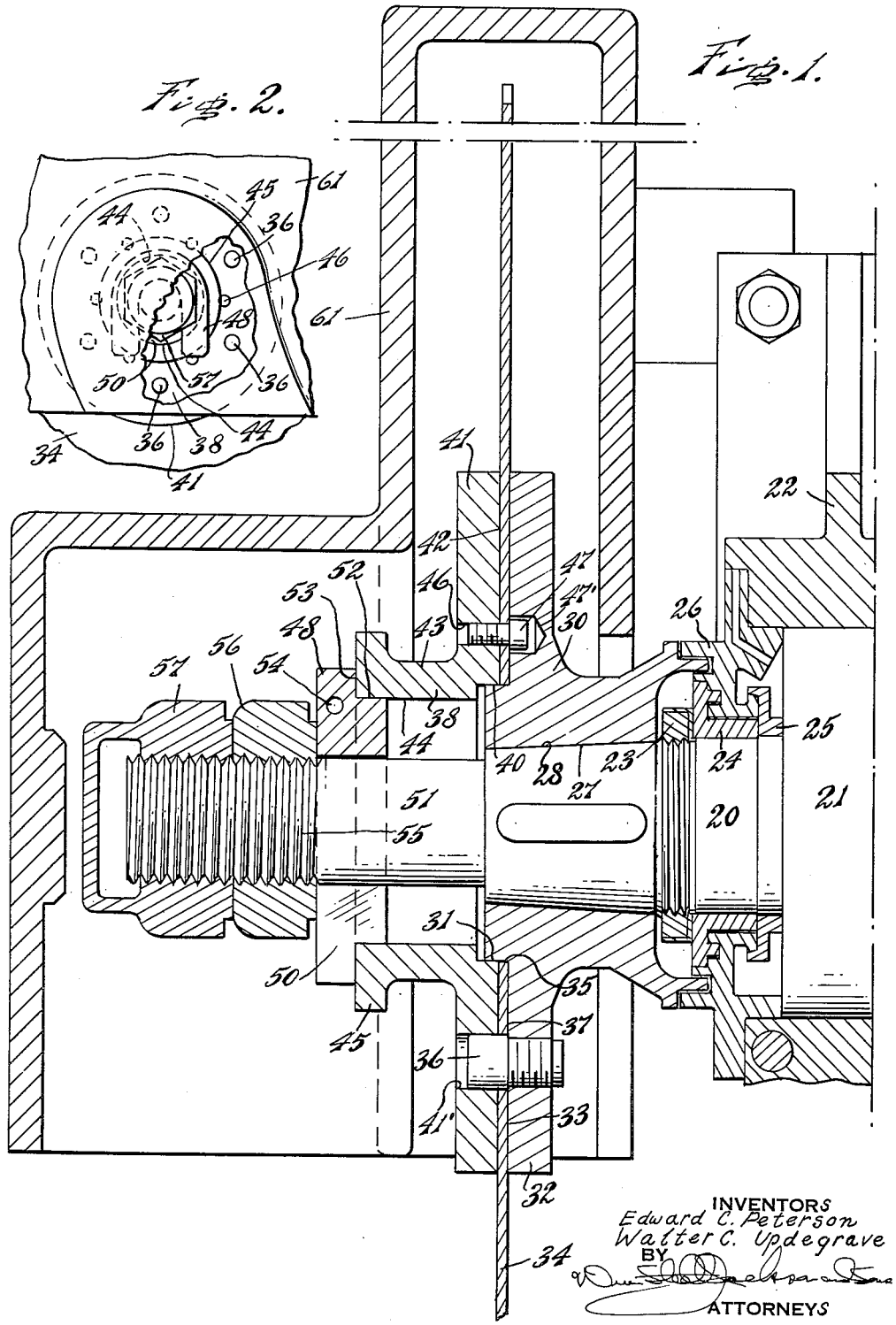

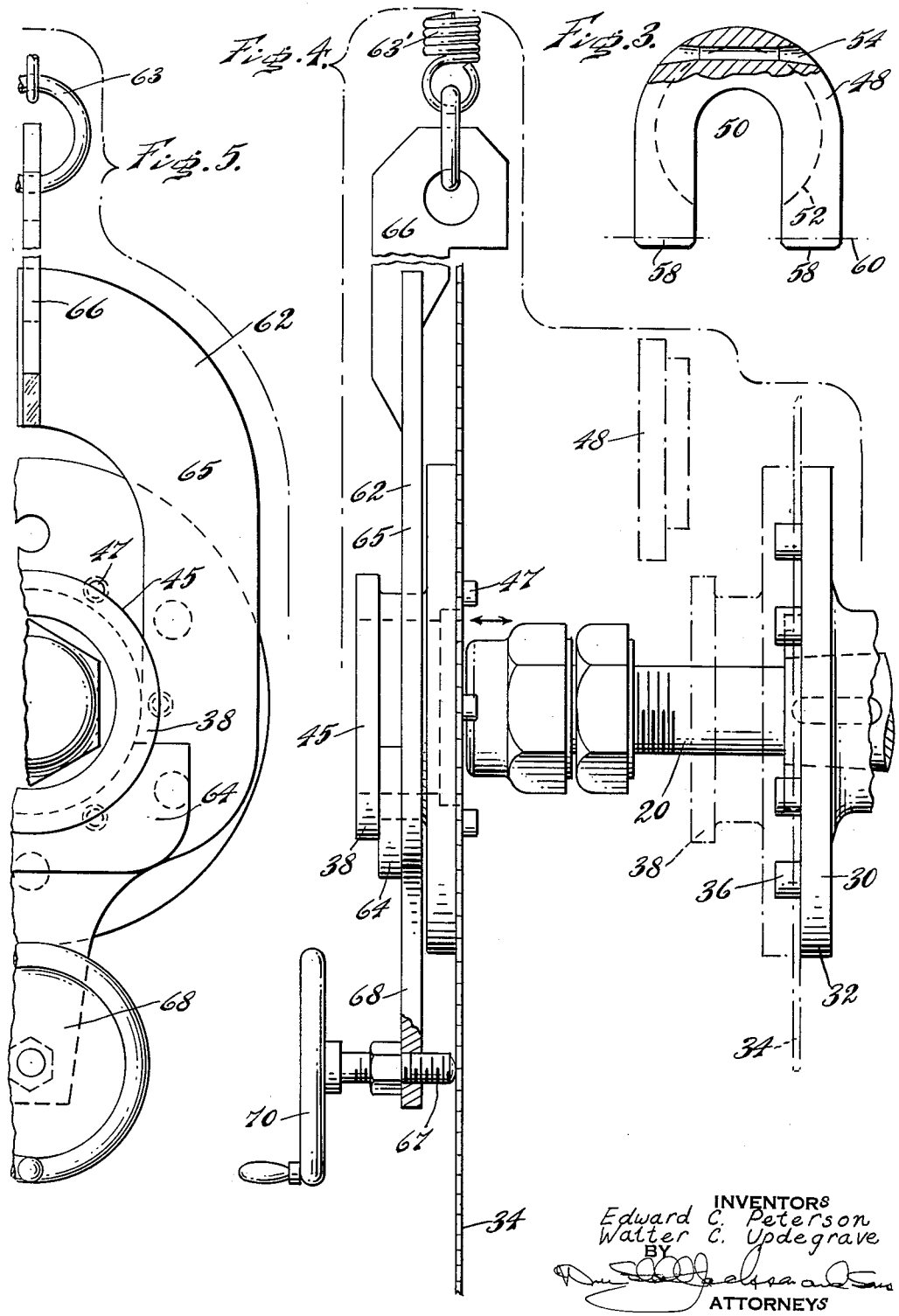

2,981,300
SAW BLADE MOUNTING

Edward C. Peterson, Douglassville, and Walter C. Updegrave, Birdsboro, Pa., assignors to Birdsboro Corporation, Birdsboro, Pa., a corporation of Pennsylvania Filed Mar. 22, 1960, Ser. No. 16,712

7 Claims. (Cl. 143—155)

The present invention relates to quickly removable and restorable saw mountings.

A purpose of the invention is to remove a saw and its outer washer from a rotatable saw arbor without removing the locking nuts.

A further purpose is to connect the saw to the outer washer as a unit and remove the saw without removing the locking nut by holding the outer washer in raised position and withdrawing the saw and outer washer longitudinally.

A further purpose is to engage the outer washer to the inner washer free of the arbor and support the inside of the saw by an extension from the inner washer, the inside diameter of the saw being larger than the outside diameter of the locking nuts.

A further purpose is to hold the outer washer by a U-shaped retainer engaged by one of the locking nuts and extending inside the interior of the outer washer.

A further purpose is to balance the saw mounting by adjusting the lengths of the legs of the horseshoe retainer.

A further purpose is to extend lugs from the inner washer through openings in the saw into openings in the outer washer.

A further purpose is to lift the outer washer by a yoke which suitably engages the bottom of the outer washer between an inner and an outer flange, and suitably support the saw by an adjustable abutment engaging the saw beneath the outer washer.

Further purposes appear in the specification and in the claims.

In the drawings we have chosen to illustrate one only of the numerous embodiments in which the invention may appear, selecting the form shown from the standpoints of convenience in illustration, satisfactory operation and clear demonstration of the principles involved.

Figure 1 is a fragmentary axial section of the device of the invention.

Figure 2 is a fragmentary front elevation to reduced scale with the guard partially broken away.

Figure 3 is a fragmentary front elevation of the horseshoe retainer showing the point at which metal is removed to balance the saw mounting, and broken away to show the opening for a lifting bar.

Figure 4 is a diagrammatic side elevation showing the removal of the saw and outer washer from the arbor.

Figure 5 is a fragmentary front elevation showing the lifting mechanism of Figure 4.

Describing in illustration but not in limitation and referring to the drawings:

In conventional saw mountings for circular saws and the like, the saw is clamped on the arbor between an inner washer and an outer washer by a locking nut or nuts threaded on the outer end of the arbor. In this construction it is necessary to remove the nut or nuts before removing the saw.

The present invention is designed to facilitate changing saws by permitting doing so without removing the nut or nuts.

The invention is particularly applicable to very large and heavy saws, such as hot saws used in steel plants, where the removal of the saw must be accomplished with the aid of a crane or hoist or the like.

The device of the invention comprises a saw arbor 20 rotatably mounted on suitable bearings 21, only one of which is shown, in a suitable housing 22.

The inner race of the bearing is clamped on the arbor as well known by a clamping nut 23 threaded on the arbor, bringing pressure through spacer rings 24 and 25, and the outer race of the bearing is clamped to the housing by a suitable cover 26 suitably secured to the housing and having labyrinth seal clearance surfaces to the rings 24 and 25. Beyond the threaded engagement with the nut 23, the arbor has a tapered portion 27 as well known, which receives the tapered interior surface 28 of an inner washer 30 which has a circular forward extension 31 coaxial with the arbor and a radial flange 32 which provides a flat surface 33 transverse to the axis which receives the inner side of a circular saw blade 34.

The inside diameter of the circular saw at 35 fits around the circular surface of the extension 31.

At circumferentially displaced intervals the flange 32 has screwed therein and extending parallel with the axis, lugs 36 which pass through and closely fit openings 37 in the saw, the lugs serving to prevent the saw from shifting its position circumferentially with respect to the inner washer.

An outer washer 38 has an interior bore 40 which suitably fits around the extension 31 on the inner washer.

The outer washer has a radially extending flange 41 which has a flat inner surface 42 engaging the outside of the saw blade. The flange 41 has openings 41' which receives the lugs 36.

Beyond the portion 40 the outer washer has a barrel-like outer extension 43 whose inside diameter or bore 44 is larger than that of the nuts on the arbor, to be described. At the outer end the outer washer has an outer flange 45 which assists in holding the outer washer on the lifting device.

At intervals around the circumference of the flange 41 of the outer washer there are threaded openings 46 which receive bolts 47 passing parallel to the axis through openings in the saw and anchoring the saw to the outer washer. The heads of the bolts 47 occupy recesses 47' in the inner washer.

A horseshoe retainer 48 has a horseshoe slot 50 which surrounds a suitably reduced cylindrical portion 51 of the arbor, and the horseshoe retainer has a circular inner extension 52 which extends within the bore 44 of the outer washer. Beyond the extension 52 the horseshoe retainer has a shoulder 53 which engages the flat outer end of the outer washer except at the slot.

A transverse opening 54 extends across the base of the horseshoe retainer and is adapted to receive a bar to permit engagement by the hooks of the crane to lift out and remove the horseshoe retainer.

At the outer end the arbor is threaded at 55 and receives an inner nut 56 and an outer nut 57.

The legs 58 of the horseshoe retainer are deliberately made too long to balance the horseshoe retainer, and they are cut off to a position as indicated at 60 to provide for balance, this cutting being done on a progressive basis at assembly.

A guard 61 protects the saw as well known.

Starting with the saw assembly as shown in Figures 1 and 2, in order to change saw blades the guard 61 is removed or swung back as well known in the art and the nuts 57 and 56 are backed off on the threads 55 until the horseshoe retainer 48 can be lifted off by inserting a bar in the opening 54 and using the crane, or dropped out vertically, as by permitting its extension 52 to pass beyond the outer end of the outer washer.

Then a yoke or lifting rig 62 connected to a crane or hoist by a suitable connector ring 63 and helical tension spring 63' is brought into position under the outer washer. The spring 63' permits the operator to manipulate the saw blade at the time of changing to make fine elevation adjustments by pulling downward or lifting upward on the saw blade or yoke, thus avoiding the necessity of adjusting the crane hook to the precise elevation for mounting the blade. The lower the spring constant of spring 63' the more easily the workman may change the elevation of the suspended saw. First a saddle 64 engages the outer washer at the bottom of the outside of the barrel portion 43 between the inner and outer flanges, being held in place by the outer flange 45. From the saddle the yoke body 65 extends upward around the side of the outer washer until it connects with a top connector bar 66 which engages the connector ring 63.

Before lift is applied, a threaded abutment 67 threaded into a downward extension 68 from the lifting yoke is pressed against the side of the saw blade, as best seen in Figure 4, by means of hand wheel 70. It will usually be possible to adjust this once and avoid making subsequent adjustments.

The crane then lifts the saw blade and outer washer slightly and moves them outward clear of the arbor and the nuts 56 and 57, after which they can be taken away to a point at which a new saw will be placed in the outer washer by removing and replacing bolts 47.

In the meantime a new outer washer and saw blade are picked up by the lifting device and the reverse operation is performed, first carrying them around the nuts 56 and 57 and the arbor until the saw blade engages the inner washer and the outer washer fits around the inner washer as shown in Figure 1. It will often be necessary to rotate the outer washer and saw blade until lugs 36 register with holes 41' in the other washer. Then the horseshoe retainer is lifted back into place and moved axially until it fits within the outer washer as shown in Figure 1 and the nuts 56 and 57 are tightened to secure the saw blade, the washers and the retainer to the arbor.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a saw blade mounting, a rotatable saw arbor, an inner washer secured to and rotatable with the saw arbor and having a radial flange adapted to engge one side of the saw blade, a saw blade engaging said one side of the inner washer, an outer washer engaging the other side of the saw blade, a horseshoe retainer surrounding the arbor on the outside of the outer washer and engaging the outer end of the outer washer, and a nut threaded to the arbor and engaging the outer side of the horseshoe retainer, the inside diameter and the outer washer and the inside diameter of the saw blade being larger than the nut, and the outer washer and saw blade being removable without removing the nut.

2. A saw mounting of claim 1, in which the horseshoe retainer brings the parts of the saw mounting into balance about the axis of the arbor.

3. A saw mounting of claim 1, in combination with means for securing the saw blade to the outer washer.

4. A saw mounting of claim 1, in which there is an axial opening through the saw blade and the outer washer, in combination with a lug on the inner washer extending through said axial opening.

5. In a saw mounting, a rotatable saw arbor having a threaded outer end, an inner washer secured to and surrounding the saw arbor, having a radial flange and having a coaxial outer extension at the outer end adjoining the arbor, a lug extending from the flange of the inner washer parallel to the axis, a saw engaging the outer surface of the flange of the inner washer and engaging and centered by the outer extension at the inside edge of the saw, said saw engaging the lug, an outer washer having a radial flange at its inner end which engages the outer side of the saw, having an interior bore which engages the outer extension of the inner washer and engaging said lug, the outer washer extending around the arbor in spaced relation thereto, a horseshoe retainer engaging the outer end of the outer washer around the arbor and having an inward extension which engages the interior of the outer washer, and a nut threaded on the arbor and engaging the outer surface of the horseshoe retainer, the inside diameter of the outer washer and the saw being larger than the outside diameter of the nut.

6. A saw mounting of claim 5, in combination with a bolt extending through the saw into the outer washer.

7. A saw mounting of claim 6, in which the horseshoe retainer balances the saw mounting.

References Cited in the file of this patent

UNITED STATES PATENTS

| | | |
|---|---|---|
| 14,480 | Wells | Mar. 18, 1856 |
| 173,126 | Little | Feb. 8, 1876 |
| 1,891,405 | Ericksson | Dec. 20, 1932 |
| 2,291,073 | Dodge | July 28, 1942 |
| 2,834,620 | Maude | May 13, 1958 |